(12) United States Patent
Tecu et al.

(10) Patent No.: US 7,259,895 B2
(45) Date of Patent: Aug. 21, 2007

(54) DEVICE AND METHOD FOR SCANNING A FIRST IMAGE OF A DOCUMENT AND PRINTING A SECOND IMAGE ON THE DOCUMENT

(75) Inventors: Kirk Steven Tecu, Greeley, CO (US); William Robert Haas, Fort Collins, CO (US); Heather N. Bean, Fort Collins, CO (US); Mark Nelson Robins, Greeley, CO (US); Matthew James Flach, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 909 days.

(21) Appl. No.: 10/301,440

(22) Filed: Nov. 21, 2002

(65) Prior Publication Data

US 2004/0100669 A1     May 27, 2004

(51) Int. Cl.
*H04N 1/04* (2006.01)
*H04N 1/23* (2006.01)

(52) U.S. Cl. .................. 358/474; 358/496; 358/498; 358/296; 358/1.18

(58) Field of Classification Search ............... 358/496, 358/498, 488, 474, 468, 486, 1.18, 1.6, 296
See application file for complete search history.

(56) References Cited

U.S. PATENT DOCUMENTS

| 6,088,121 A | * | 7/2000 | Baumann | 358/1.18 |
| 6,160,642 A | | 12/2000 | Mui et al. | 358/498 |
| 6,276,771 B1 | | 8/2001 | Kim et al. | 347/3 |

FOREIGN PATENT DOCUMENTS

| EP | 0541262 B1 | 5/1993 |
| JP | 9058067 A2 | 3/1997 |

OTHER PUBLICATIONS

UK Search Report dated Apr. 8, 2004 (3 pgs.).

* cited by examiner

*Primary Examiner*—Cheukfan Lee

(57) ABSTRACT

A device for scanning a first image on a document surface and printing a second image on the document surface comprising a mechanism operable to engage a document and drive the document along a feed path, a scanner apparatus operable to generate a scanned image of the first image on the document surface as the document is driven past the scanner apparatus during a first document traversal of the feed path, and a printer apparatus operable to print the second image on the document surface as the document is driven past the printer apparatus during the traversal of the document through the feed path is provided.

25 Claims, 5 Drawing Sheets

DEVICE AND METHOD FOR SCANNING A FIRST IMAGE OF A DOCUMENT AND PRINTING A SECOND IMAGE ON THE DOCUMENT

TECHNICAL FIELD OF THE INVENTION

This invention relates to imaging devices and, more particularly, to a device and method for scanning a first image on a document and printing a second image on the document.

BACKGROUND OF THE INVENTION

Multi-functional imaging devices are common in today's computing environments. For example, some printing devices (such as laser printers or ink-jet printers) are now integrated with copying, scanning and/or faxing devices. However, multi-functional devices are generally limited to performing a particular operation on a given media. For example, a user of a multi-functional device may select a print mode to direct the multi-functional device to print on the media. After the media has been printed on, the multi-functional device ejects the media and the user is required to reload the media if it is desired to perform another operation on the media.

Often, a particular media, for example a form document, requires user input to specific fields thereof. Users may provide manual input, such as by handwriting, into fields of a form document or by data entry facilitated with a device such as a typewriter. However, handwriting into a field of a document is often undesirable as data entered in such a manner may often be unreadable by other persons. Entry of data by a typewriter is error prone and may often be misaligned and/or may include typographical errors because there is no capability to review the data entry prior to input thereof.

SUMMARY OF THE INVENTION

Heretofore, no device or technique has been provided that allows scanning of a document, such as a form document, and subsequent printing thereon with a device that does not require reloading of the original media from which the scanned image was generated. In accordance with an embodiment of the present invention, a device for scanning a first image on a document surface and printing a second image on the document surface comprising a mechanism operable to engage a document and drive the document along a feed path, a scanner apparatus operable to generate a scanned image of the first image on the document surface as the document is driven past the scanner apparatus during a first document traversal of the feed path, and a printer apparatus operable to print the second image on the document surface as the document is driven past the printer apparatus during the traversal of the document through the feed path is provided.

In accordance with another embodiment of the invention, a method of generating a scanned image of a first image disposed on a surface of a document and printing a second image on the surface comprising engaging the document with a mechanism operable to drive the document through a feed path, driving the document through a traversal of a feed path by a scan head of a scanner apparatus and generating a scanned image of the first image, and driving, during traversal of the feed path, the document by a printer apparatus operable to print the second image on the surface is provided.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 7 of the drawings, like numerals being used for like and corresponding parts of the various drawings.

Figure 1:
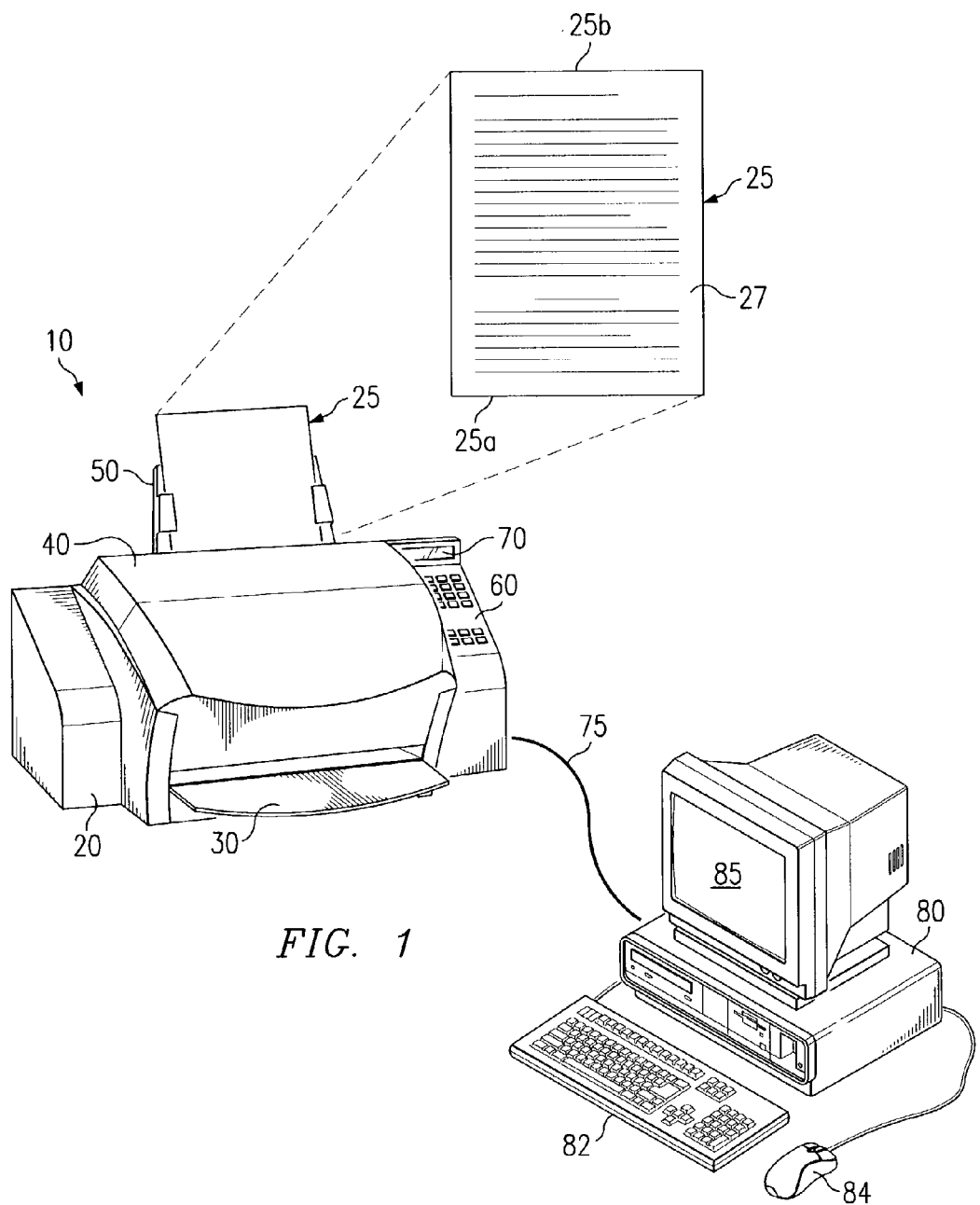
FIG. 1 is a perspective view of an integrated printer/scanner multi-functional device according to an embodiment of the present invention.

FIG. 1 is a perspective view of an integrated printer/scanner multifunctional device 10 according to an embodiment of the present invention. Multi-functional device 10 may include a printer device, a scanner device, and other functional devices such as a fax device, in a housing 20. In a preferred embodiment, multi-functional device 10 comprises an electrophotographic printer having a laser print engine as well-known in the art. However, it is understood that under principles of the invention, the printer device included within multi-functional device 10 may also be an ink-jet printer (also referred to as a 'drop-on demand' printer apparatus) having a conventional ink-jet engine, or the printer device may be some other conventional printing apparatus. In the embodiment shown, multi-functional device 10 includes a media tray 50 that may slideably extend from housing 20 and may hold one or more media elements, such as a document 25. However, multi-functional device 10 may include other variations or a plurality of trays. Multi-functional device 10 may include an output tray 30 for receiving media ejected therefrom, such as sheets of paper that have been scanned, printed upon, faxed, or otherwise processed by multi-functional device 10. Multi-functional device 10 may include an access panel 40 that is connected to housing 20 and that is removable, or otherwise repositionable, that facilities access to components disposed within housing 20.

Device 10 also comprises a scanner that may include conventional scanning technologies and functionalities. The scanner device is generally operable to convert an image 27 on media 25 into an electronic form suitable for copying, storing and processing by a computer 80. Device 10 may be interconnected with computer 80 via any one of various external peripheral interfaces, such as an electrical cable 75 and a serial port interconnection, parallel port interconnection, a universal serial bus interconnection, or another suitable interface. An image scanned by the scanner device of multi-functional device 10 may be displayed on a display device 85, such as a cathode ray tube (CRT) display, connected to computer 80. Computer 80 may have various peripheral devices, such as a keyboard 82, a mouse 84, and/or another input device, for receiving user input thereto and respectively connected therewith via an input/output interface, such as a serial port, a parallel port, a PS/2 port or another suitable interface disposed on computer 80. User input provided to computer 80 may be provided to facilitate operation of multi-functional device 10. Multi-functional device 10 may have an input panel 60 that comprises one or more keys used for inputting commands from the user thereof and that facilitate operation of multi-functional device 10. Additionally, multi-functional device 10 may have an output device 70, such as a liquid crystal display, for providing visual feedback regarding operational status, operational mode, or other information regarding operational condition(s) of multi-functional device 10.

Figure 2A:
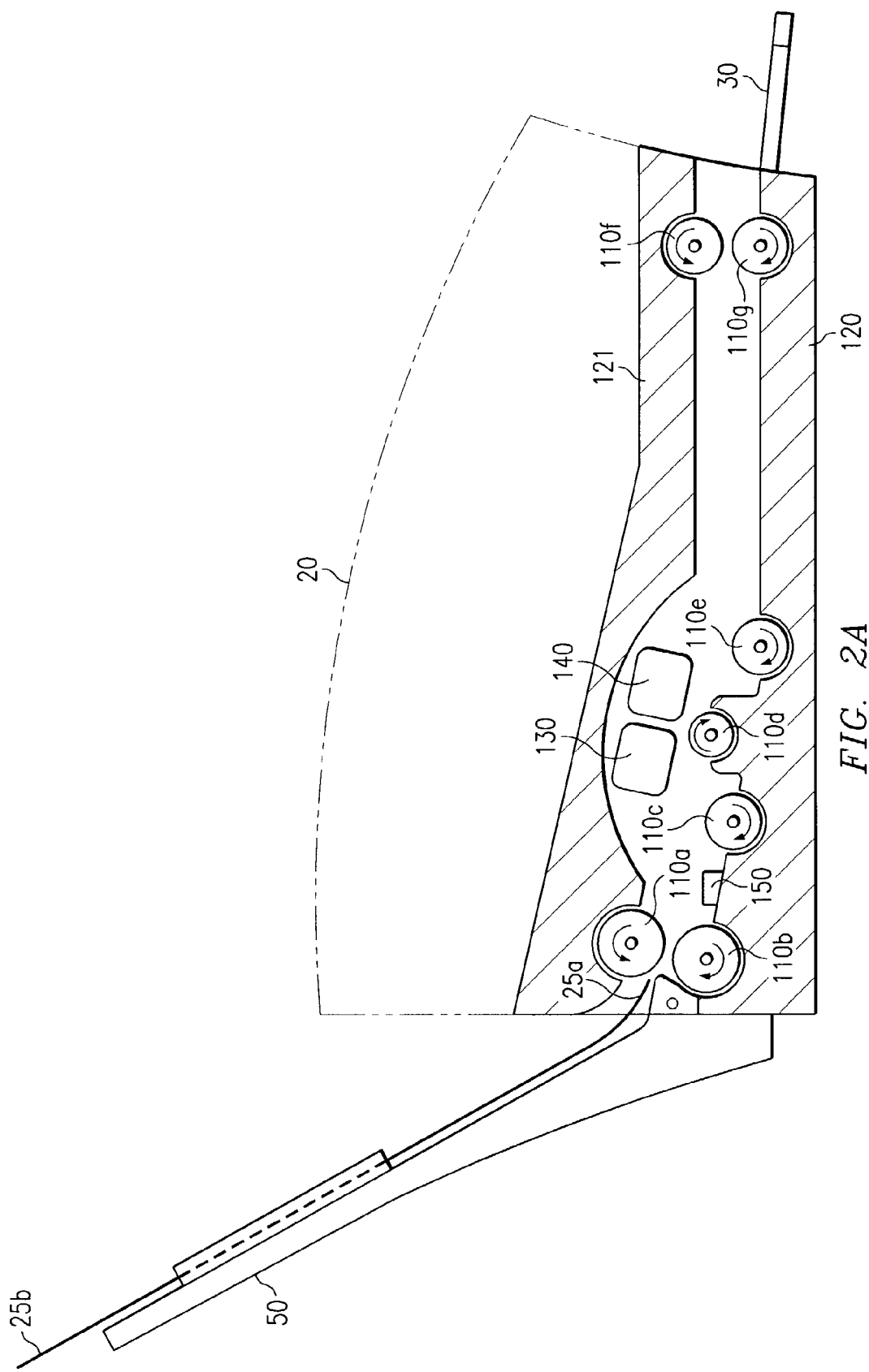
FIG. 2A is a cross-sectional side schematic of the multi-functional device of FIG. 1.

FIG. 2A is a cross-sectional side schematic of multi-functional device 10. Media tray 50 may support one or more documents that may be fed to device 10. One or more feed rollers 110A-110I may be rotateably engageable with document 25 and may drive document 25 through a feed path within housing 20. The feed path may be defined by feed rollers 110-110I and/or one or more structures 120-121. The feed path generally defines a passage from media tray 50 and output tray 30 and provides passage of document 25 by a scanner apparatus 130 and a printer apparatus 140 in proximity such that a respective scan operation and print operation may be performed on document 25 during traversal of the feed path.

One or more operational modes may be selected by interaction with one or more keys of input panel 60 or, alternatively, by input to computer 80 coupled with device 10. For example, a print mode may be selected by depression of one or more keys of input panel 60. Upon selection of a print mode, a document 25 may be fed through the document feed path and printer apparatus 140 may be actuated such that a print media is ejected onto document 25 during passage thereby. A scan mode of operation may likewise be selected by, for example, input provided to input panel 60 and document 25 may be fed through the document feed path. Scanner apparatus 130 may be actuated and an image on document 25 may be optically scanned, conveyed to computer 10, and displayed on display device 85. Scanner apparatus 130 may be implemented as a conventional scanner device, for example, and may accordingly comprise a scanner head having a linear optical sensor array, such as a charge-coupled device (CCD), that converts light into electrical charges, a light source, such as a cold-cathode fluorescent, for illuminating a document surface, and a configuration of mirrors, lens, and/or filter(s) for directing and filtering light reflected, or alternatively passed through, the document to be scanned. Briefly, scanning devices utilizing CCD technologies radiate light onto the object to be scanned. Light reflected from the scanned object may impinge a configuration of mirrors that directs the reflected image onto a lens. The lens may focus the reflected image onto a filter, such as a red, green and/or blue filter, prior to directing the reflected image onto the CCD array. A computer algorithm, or scanning application, may then assemble the filtered image scans into a single, color-scanned image. Alternatively, scanner apparatus 130 may be implemented as a contact-image sensor (CIS) apparatus or another imaging technology.

The present invention facilitates scanning and printing on a media object, such as document 25, during a single operation in which both scanner apparatus 130 and printer apparatus 140 are sequentially actuated. A scan-and-print mode of operation may be selected by input provided to input panel 60. One or more feed rollers 110A-110I may be actuated and begin driving document 25 along a document feed path. Feed rollers 110A-110I are preferably driven by a reversible power source, such as a reversible DC motor, such that feed rollers 110A-110I are operable to reciprocally drive a document along a forward feed path and a reverse feed path. A forward feed path is a document traversal in which a document is, in general, driven through a path in a direction from media tray 50 towards output tray 30 while a reverse feed path is a document traversal in which the document is, in general, rotateably engaged with one or more feed rollers 110A-110I and driven through a path in a direction from output tray 30 towards media tray 50. As document 25 is driven past scanner apparatus 130, an image of a surface of document 25 is electrically generated and may be conveyed to computer 80 for processing thereby and/or display on device 85. Upon completion of imaging of document 25, one or more feed rollers 110A-110I may be reversed and, accordingly, document 25 is driven through a reverse feed path. Upon completion of document traversal along a reverse feed path, scanner apparatus 130 may be deactuated and printer apparatus 140 may be actuated. One or more feed rollers 110A-110I may be again reversed such that document 25 is driven along a forward feed path during which a print operation may be performed on the document. Prior to driving document 25 through the reverse feed path (also referred to herein as a 'reverse traversal'), disengagement of document 25 with feed rollers 110A-110I may be performed such that document 25 traversal through device 10 is temporarily halted. Re-engagement of document 25 with feed rollers 110A-110I may then be performed after display of the scanned image and/or supply of input for printing on document 25 as described more fully hereinbelow.

One or more sensors 150, such as an optical sensor, may be disposed within device 10 such that traversal past a predefined position within device 10 of a portion of document 25 may be detected and actuation of one or more apparatuses of device 10 may be coordinated therewith. For example, sensor 150 may be configured to detect traversal of an edge, such as an anterior edge 25A, of document 25 passing a predefined position. Upon detection of anterior edge 25A passing the predefined position, sensor 190 may convey the detection to a device controller. The controller may then actuate scanner apparatus 130 and document 25 may accordingly be imaged during passage by scanner apparatus 130. Sensor 150 may also be configured to detect passage of a posterior edge 25B and one or more device 10 subroutines may be coordinated therewith. For example, upon detection of passage of posterior edge 25B passing a predefined position within device 10, reversal of feed rollers 110A-110I may be initiated and deactivation of scanner apparatus 130 may be made. Document 25 is then driven along a reverse feed path. Sensor 150 may again perform a detection, such as detection of posterior edge passing a predefined position, and initiate another device subroutine thereupon. For example, upon passage of posterior edge 25B past a predefined position during the reverse traversal, sensor 150 may convey such detection to a controller that may accordingly reverse one or more of feed rollers 110A-110I such that document 25 is again driven along the forward feed path, i.e. a forward traversal. An image may be printed upon a surface of document 25 during traversal of document 25 past printer apparatus 140.

Figure 2B:
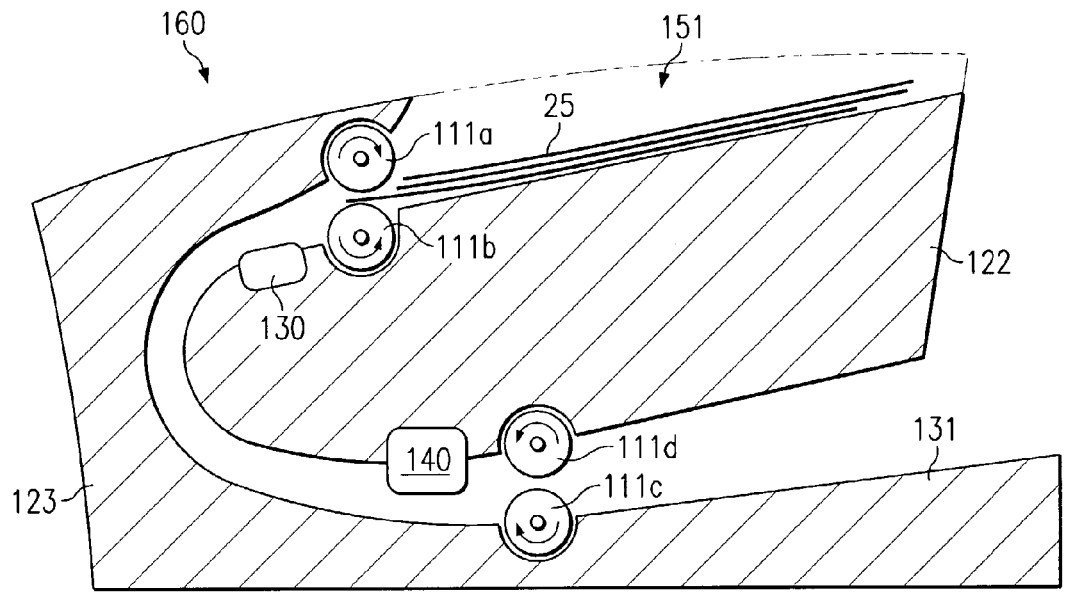
FIG. 2B is a cross-sectional side schematic of an alternative multi-functional device having a unidirectional feed mechanism according to an embodiment of the present invention.

In FIG. 2B, there is a cross-sectional side schematic of an alternative multi-functional device 160 having a unidirectional feed mechanism according to an embodiment of the present invention. A media tray 151 may support one or more documents that may be fed through device 160. One or more feed rollers 111A-111D may be rotateably engageable with document 25 through a feed path within a device housing. The feed path generally defines a passage from media tray 151 and an output tray 131 and provides passage of document 25 by a scanner apparatus 130 and a printer apparatus 140 in proximity such that a respective scan operation and print operation may be performed on document 25 during traversal of the feed path.

Device 160 may be coupled to computer 80 and may have one or more keys or other elements that facilitate selection of an operational mode, such as a scan mode or a print mode, of device 160. Alternatively, an operational mode of device 160 may be selected by interaction with computer 80. A combination scan-and-print mode may be performed by device 160 according to an embodiment of the present invention. In a combination scan-and-print mode, document 25 is driven past scanner apparatus 130 and electrically imaged thereby. Data representative of the scanned image is conveyed to computer 80 for processing and/or display on device 85. Thereafter, a print operation may be performed during passage of document 25 by print apparatus 140, as described more fully hereinbelow. Thus, in various embodiments of the present invention, a device and method is provided for driving a document past a scanner apparatus of the device, generating an electrical image of the document, and printing another image on the document without ejecting, or otherwise removing, the document from the device between the scan and print routines performed on the document.

Figure 3:
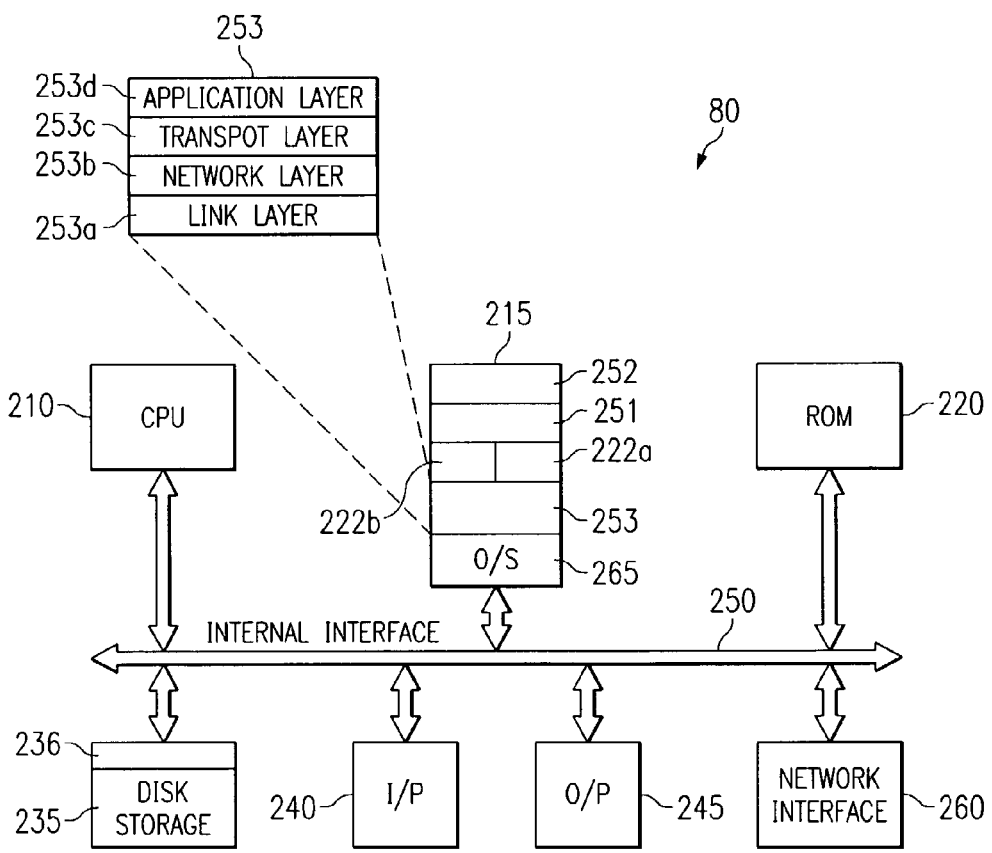
FIG. 3 is a simplified block diagram of a computer that may be coupled to, and facilitate operation of, the multi-functional device of FIGS. 1 and 2.

With reference now to FIG. 3, there is a simplified block diagram of computer 80 that may be coupled to, and facilitate operation of, device 10. Computer 80 stores a graphics application 222A in a memory unit 215, such as a random access memory module. Through conventional techniques, application 222A is executed by an operating system 265 and one or more conventional processing elements 210 such as a central processing unit. Operating system 265 performs functionality similar to conventional operating systems. More specifically, operating system 265 controls the resources of computer 80 through well-known techniques and interfaces the instructions of application 222A with processing element 210 as necessary to enable application 222A to properly run.

Processing element 210 communicates with and drives the other elements within computer 80 via a local interface 250, which may comprise one or more buses. Furthermore, an input device 240, for example keyboard 82 or mouse 84, can be used to input data from a user of computer 80, and an output device 245, for example display device 85, can be used to output data to the user. A disk storage device 235, such as a magnetic disk, optical disk, or another device, can be connected to local interface 250 to transfer data thereto and therefrom.

A display driver 251 is maintained in memory unit 215 and is operable to convert an image representation into red, green, blue (RGB) format suitable for display on device 85. A printer driver 252 may be maintained in memory unit 215 and is operable to translate image data received from application 222A into a format suitable for printing (also referred to herein as "printer formatted data") by printer apparatus 140 and to convey the translated image data to device 10 via cable 75. Image data converted to printer formatted data may have been previously conveyed to computer 80 via scanner apparatus 130.

Figure 4:
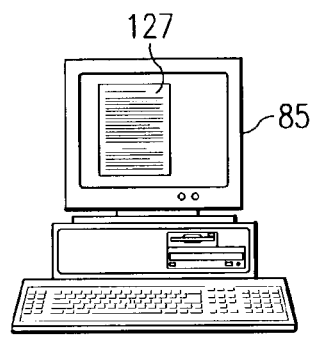
FIG. 4 is a simplified schematic of a display device having a scanned image displayed thereon according to an embodiment of the present invention.

As a document, or another scan object, is imaged by device 10, an electronic representation of the document may be forwarded, via cable 75, to computer 80 where it may be processed by graphics application 222A and thereafter provided to display driver 251 for display of a scanned image 127 on device 85, as shown by the simplified schematic of device 85 in FIG. 4. For example, document 25 may be scanned by device 10 by traversal thereof past scanner apparatus 130 and scanned image 127 of an image 27 may be displayed on device 85. Thereafter, one or more feed rollers 110A-110I may be reversed so that document 25 traverses a reverse feed path. Feed rollers 110A-110I may again be reversed (such that engagement therewith by document 25 results in traversal of document 25 in a forward feed path). Another image(s) may then be printed on document 25 during passage thereof by printer apparatus 140.

Figure 5A:
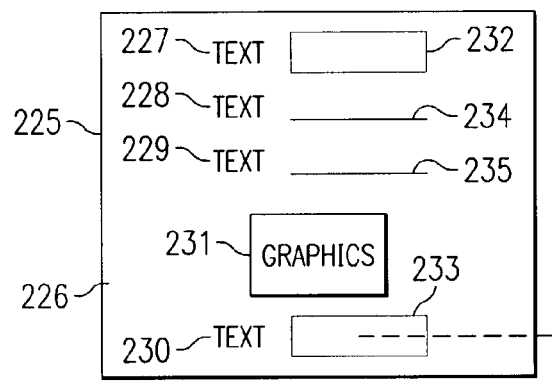
FIG. 5A is an exemplary schematic of a document having a surface that may have various graphics, text or other images thereon that may be scanned by the multi-functional device of the present invention and may have text, graphics, or other images printed thereon according to an embodiment of the present invention.

With reference now to FIG. 5A, there is an exemplary schematic of a document 225 having a surface 226 that may have various graphics, text or other images thereon. Exemplary document 225 has a plurality of text elements 227-230 and a graphics element 231 on surface 226. Exemplary document 225 may be a form document that may have numerous document field, such as blank box field, line fields, or other elements, such that descriptive data may be respectively entered therein. Document 225 has two box fields 232 and 233 and two line fields 234 and 235 in which a user may enter data therein. The embodiments of the present invention facilitate entry of data into a document field by first scanning the document, displaying the scanned image thereof, and providing a graphic overlay to the scanned image through which a user may enter data, for example via an input device 240 coupled with computer 80, that is thereafter printed on the scanned document.

Figure 5C:
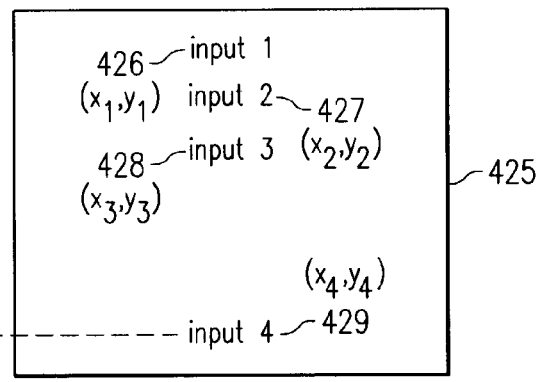
FIG. 5C is a simplified schematic of a secondary image that may be overlaid on the scanned image of FIG. 5B by a graphics application according to an embodiment of the present invention.
Figure 5B:
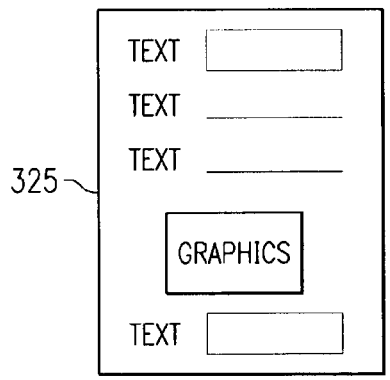
FIG. 5B is an exemplary schematic of a scanned image that may be produced by traversing the exemplary document of FIG. 5A past a scanner apparatus of a multi-functional device and displayed on a display device according to an embodiment of the present invention.

In FIG. 5B, there is an exemplary schematic of a scanned image 325 that may be produced by traversing document 225 past scanner apparatus 130 and displayed on device 85 interconnected with computer 80. Scanned image 325 may be generated by combining sequential scan lines generated during passage of document 255 past scanner apparatus 130 and storing imaged data representative of the scanned image in a pixel array or another suitable data structure. Upon completion of capture of sequential scan lines during traversal of document 225 past scanner apparatus 130, graphics application 222A may process data representative of the sequential scan lines, forward the processed data to display driver 251 and scanned image 325 may thereafter be displayed on device 85. Graphics application 222A may then generate data representative of a secondary image 425 (FIG. 5C) that may be overlaid, or transposed, on scanned image 325.

Secondary image 425 (also referred to herein as an 'overlay') may initially comprise no image elements and may simply provide a user interface for manipulating data that is to be printed onto document 225 from which scanned image 325 was captured. For example, upon an initial rendering of secondary image 425, an image border may be displayed with no visible image elements therein displayed on device 85 such that scanned image 325 appears on device 85 unobstructed, that is with no forefront elements of secondary image 425 overlaid on scanned image 325. A user may interact unknowingly with secondary image 425, for example believing the user is navigating a cursor, mouse pointer, or another display element to a desired position in scanned image 325 for inputting text, graphical objects, or other visible objects that are to be printed at a corresponding position of document 325 where the user is actually interacting with secondary image 425. A location of the positional icon may be defined by a coordinate system, such as an x- and y- axis coordinate, that may be mapped to a position of secondary image 425 and, thus, to scanned image 325. The user may accordingly select a position of secondary image 425 and input a graphical element, such as text, an image, or another element, that is inserted at the selected position within secondary image 425.

Figure 5D:
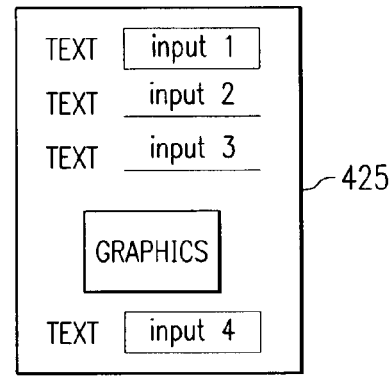
FIG. 5D is a simplified schematic of the secondary image of FIG. 5C having user input inserted therein and that may be converted to printer formatted data and printed on the document from which the scanned image of FIG. 5B is generated according to an embodiment of the present invention.

With reference now to FIGS. 5C and 5D, a user may select a position 426 of secondary image 425 by navigating a positional element, such as a mouse cursor, over scanned image 325 and secondary image 425 overlaid therewith. Position 426 has a coordinate (x1, y1) associated therewith. The user may then input a graphical element, such as a text string ('input 1'), by providing appropriate input to computer 80, for example by inputting a string of text to keyboard 82. The input text string is then inserted at position 426 into secondary image 425, as shown in the schematic of secondary image 425 of FIG. 5D. The user may select another position, such as position 427 having another coordinate (x2, y2) and insert an additional element, such as another text string ('input 2), at the selected position 427 and graphics application 222A accordingly inserts the input element into secondary image 425. The user may continue to navigate the position element and provide additional input (such as additional text strings 'input 3' and 'input 4') at other selected positions (positions 428 and 429 having respective coordinates (x3, y3) and (x4, y4)) until all desired inputs have been made.

As inputs are made and secondary image 425 is updated to include input of graphical elements thereto, graphics application 222A may update secondary image 425 such that the overlay thereof with scanned image 325 provides a visual output to the user via display device 85 of how a composite of scanned image 325 and secondary image 425 will appear. Upon completion of providing input to secondary image 425, for example by selection of an appropriate command by the user, a print operation may be initiated that results in traversal of document 225 past printer apparatus 140. Secondary image 425 may be conveyed to printer driver 252 for conversion into printer formatted data and thereafter conveyed to device 10 via cable 75. As document 225 is driven past printer apparatus 140, the printer formatted data representative of secondary image 425 is printed on document 325.

While the aforedescribed technique utilizes a graphics overlay for facilitating entry of user input to be printed in one or more regions of a scanned document, an alternative embodiment of the present invention may use a data source for supplying data to be printed in one or more document fields. With reference again to FIG. 3, computer 80 may be equipped with a conventional network interface 260 that facilitates exchanges of data with a network. Preferably, network interface 260 is a public network interface and, accordingly, computer 80 may be equipped with a network stack 253. In general, network stack 253 is a collection of network software in operating system 265 that provides access to a network. Network stack 253 may be implemented according to various configurations and capabilities and, in general, will include appropriate layers for accommodating external network interface 260 and various requisite network protocols. For example, network interface 260 may be an Ethernet interface and network stack 253 may accordingly have an appropriate Ethernet link layer 253A driver. Network interface 260 may interconnect computer 80 and, for example, the public Internet and network stack 253 may accordingly comprise an IP network layer 253B and a transport control protocol driver included as a transport layer 253C. Application layer 253D may facilitate encapsulation and conveyance of various graphics application 222A data with lower layers of network stack 253.

The present invention may be implemented with a transaction database 236 (FIG. 3), or another suitable data structure, for facilitating an advanced document control system according to another embodiment of the present invention. A form analysis subroutine 222B may be included, or invoked, by graphics application 222A for analyzing a document 225 layout. Form analysis subroutine 222B may be implemented as a conventional graphics, or image, recognition algorithm and may perform analysis and recognition of a document form based on recognition of various graphics structures and the configuration, or arrangement, thereof on a document. Recognition of a document form may then be used to facilitate automated printing of data into one or more document fields of the recognized document.

Figure 6:
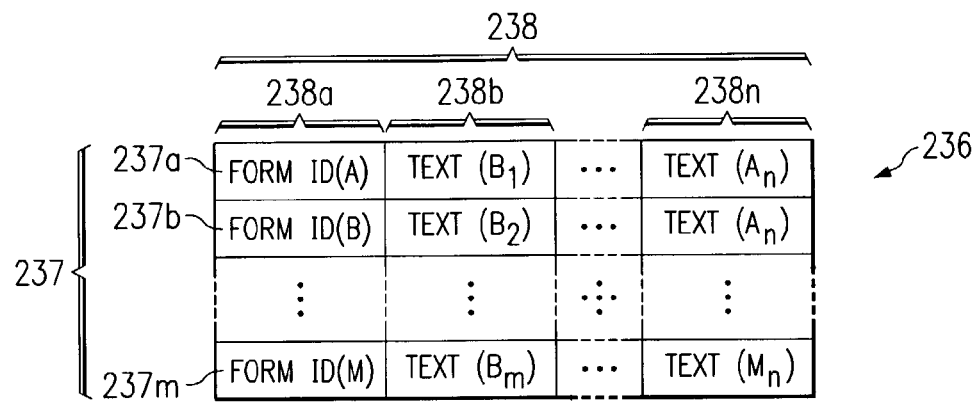
FIG. 6 is a schematic of a transaction database implemented as a table comprised of one or more records and one or more fields for storing data that may be printed on a document upon scanning and recognition of the document according to an embodiment of the present invention.

With reference now to FIG. 6, there is shown a schematic of transaction database 236 implemented as a table comprised of one or more records 237 and one or more fields 238 for storing data that may be printed on a document upon scanning and recognition of the document according to an embodiment of the present invention. A key field 238A may comprise one or more entries respectively containing a unique identifier used to index a corresponding record 237A-237M. Each record 237A-237M may respectively comprise one or more data elements contained in corresponding data fields 238B-238N. Each data element of a record 237A-237M may be associated with a particular document field of a form document identified by a corresponding identifier contained in key field 238A. For example, form document 525 may be identified by key field ID(A) maintained in record 237A and each data element maintained in data fields 238B-238N of record 237A may be associated with one of document fields 532-539. Upon scanning of document 525, recognition subroutine 222B may identify document 525 and index transaction database 236 with the identifier (ID(A)) assigned to form document 525 and thereby retrieve one or more data elements maintained in data fields 238B-238N of record 237A. Each data entry recorded in a field of record 237A-237M may be entered, for example, by a user supplying input to computer 80 through one of various conventional input devices 240. Alternatively, a data source may be accessed by computer 80 that populates one or more fields of records 237A-237M with data maintained by the accessed data source. Database 236 may accommodate records 237A-237M having different numbers of entries into fields thereof for, by example, allowing null entries into empty field elements of a record thereby indicating that the document assigned to that particular record 237A-237M has no document field assigned to the nullified field. Thus, documents of differing configurations and disparate numbers of document fields may each be assigned a record of a common transaction database 236. While transaction database 236 is shown disposed within computer 80, optional provisioning of computer 80 with network interface 260 and network stack 253 enables database 236 to be disposed in an external network, such as the Internet.

Thus, a document may be scanned according to the general techniques described hereinabove and recognition of the scanned document configuration, or form, may be facilitated by invocation of recognition subroutine 222B. While recognition subroutine 222B is described hereinabove as being maintained and executed by computer 80, subroutine 222B may alternatively be implemented as a scanner subsystem and disposed within device 10. An identifier associated with the recognized document form is next used to index a record 237A-237M of database 236 and retrieve one or more data elements from field(s) 238A-238M. Each field 238A-238M may have a particular document field of form document 525 assigned thereto and into which data read from field 238A-238M is printed according to the general techniques of the invention as aforedescribed.

Figure 7:
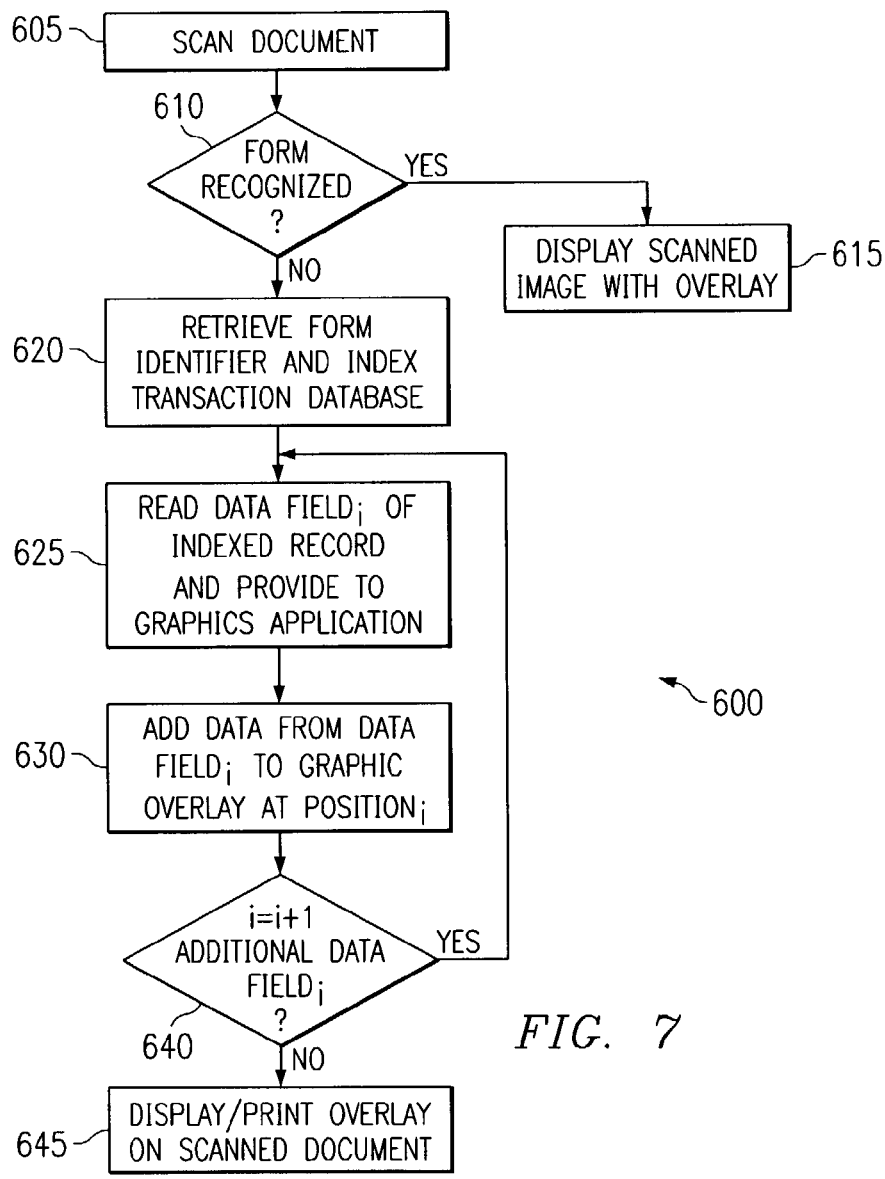
FIG. 7 is a flowchart of a scanning and printing routine facilitated by the transaction database described with reference to FIG. 6 according to an embodiment of the present invention.

With reference now to FIG. 7, there is a flowchart 600 of a scanning and printing routine facilitated by transaction database 236 according to an embodiment of the present invention. A document is first scanned by driving the document past scanning apparatus 130 and generating imaging data representative of the document (step 605). The imaging data may then be conveyed to subroutine 222B for analysis of the image configuration for potential identification of a document form (step 610). Failure to identify a document form may result in display of the scanned image and an image overlay for facilitating entry of user input for subsequent printing on the scanned document as described hereinabove with reference to FIGS. 5A-5D (step 615). A successful identification of a form of the scanned document results in retrieval of an identifier of the form and indexing of database 236 therewith (step 620). Thereafter, the contents of a data field of a record indexed with the form identifier are retrieved and provided to graphics application 222A (step 625). Graphics application 222A may then add the contents of data field, to a graphics overlay at a position assigned to that particular field element (step 630). As mentioned hereinabove, each entry of data fields 238B-238N of record 237A-237M respectively indexed by the form identifier of a scanned document may be associated with a document field. For example, the entry (text(B1)) of data field 238B may be associated with a document field, such as box field element 532, of document 525. The position to which contents of a particular data field are assigned to a graphics overlay may be made by mapping a graphic overlay coordinate position to a document field coordinate. Such a positional mapping may be made by associating a logical link table of coordinates to each data field 238B-23N of each record, or by another conventional technique. Thereafter, an evaluation of whether additional data fields of the indexed record remain is made (step 640). Processing may return to retrieval of data field contents upon an affirmative evaluation of remaining data records. Alternatively, the completed overlay may be displayed and/or printed with all contents of each data field of the indexed record (step 645).

Thus, a multi-functional imaging device operable to scan an image on a document and print a second image on the document that does not require reloading of the document is provided. Furthermore, the scanned image may be displayed prior to printing of the second image such that a user of the device may manipulate the second image and review how the document will appear after printing of the second image prior to performing the print operation. The present invention may find particular advantage in processing of form documents that require data or graphical entry into a form document by allowing scanning of the document and input of the data or graphical entry by a computer interconnected with the imaging device such that a graphical image of the scanned document with the desired input may be reviewed prior to printing of the second image onto the document.

What is claimed is:

1. A device for scanning a first image on a document surface and printing a second image on the document surface, comprising:
   a mechanism operable to engage a document and drive the document along a feed path;
   a scanner apparatus operable to generate a scanned image of the first image on the document surface as the document is driven past the scanner apparatus during a first document traversal of the feed path;
   a printer apparatus operable to print the second image on the document surface as the document is driven past the printer apparatus during the traversal of the document through the feed path;
   and wherein the mechanism is disengaged from the document upon generation of data representative of the scanned image.

2. The device according to claim 1, herein the mechanism is a reversible mechanism operable to reciprocally drive the document along a feed path.

3. The device according to claim 1, wherein the first document traversal occurs along a forward feed path, and driving the document past the printer apparatus occurs in a second document traversal along the forward feed path.

4. The device according to claim 1, wherein the first document traversal occurs along a forward feed path, and driving the document past the printer apparatus occurs in a second document traversal along a reverse feed path.

5. The device according to claim 2, wherein the reversible mechanism comprises at least one feed roller rotatably engagable with the document, the at least one feed roller driven by a reversible direct current motor.

6. The device according to claim 1, wherein the printer apparatus is at least one of a drop-on-demand printing apparatus and a laser printing apparatus.

7. The device according to claim 1, wherein the scanner apparatus comprises a charge-coupled device and an illumination source.

8. The device according to claim 1, wherein the scanner apparatus comprises contact imaging sensor.

9. The device according to claim 1, further comprising an external peripheral interface operable to transfer to the device data representative of the second image from a computer coupled thereto.

10. The device according to claim 9, wherein data representative of the first image is conveyed to the computer by the external peripheral interface.

11. The device according to claim 1, wherein data representative of the scanned image is conveyed to a computer.

12. The device according to claim 1, wherein the mechanism is re-engaged with the document upon reception of a print command.

13. The device according to claim 1, further comprising an input key, a print command provided by a user of the device by actuation of the input key.

14. The device according to claim 1, wherein a print command is conveyed to the device via the external peripheral interface.

15. A method of generating a scanned image of a first image disposed on a surface of a document and printing a second image on the surface, comprising:
    engaging the document with a mechanism operable to drive the document through a feed path;
    driving the document through a traversal of the feed path by a scan head of a scanner apparatus and generating a scanned image of the first image; and driving, during traversal of the feed path, the document by a printer apparatus operable to print the second image on the surface;
    and wherein the mechanism is disengaged from the document upon generation of data representative of the scanned image.

16. The method according to claim 15, wherein engaging the document with a mechanism further comprises engaging the document with a reversible mechanism operable to drive the document through a forward feed path and a reverse feed path.

17. The method according to claim 16, wherein driving the document by a scan head further comprises driving, in a forward feed path, the document by the scan head.

18. The method according to claim 15, further comprising displaying the scanned image on a display device.

19. The method according to claim 18, further comprising overlaying the second image onto the scanned image, the displayed scanned image having the second image overlaid therewith.

20. The method according to claim 15, further comprising:
    providing data representative of the second image to be printed on the document to a display device; and
    displaying the first image with the second image overlaid therewith on the display device.

21. The method according to claim 20, wherein providing the data further comprises providing the data by a computer.

22. The method according to claim 20, wherein providing the data comprises providing the data upon interaction with at least one of a pointer device and a Keyboard coupled with a computer.

23. The method according to claim 20, wherein providing the data comprises reading the data from a database.

24. The method according to claim 15, further comprising:
    conveying data representative of the scanned image to a computer; and
    analyzing the data with an image recognition algorithm.

25. The method according to claim 24, further comprising:
    identifying the data representative of the scanned image as conforming to a document form; and
    retrieving s record of a database associated with the document form, the retrieved record comprising data representative of the Second image.

\* \* \* \* \*

UNITED STATES PATENT AND TRADEMARK OFFICE
CERTIFICATE OF CORRECTION

| | | |
|---|---|---|
| PATENT NO. | : 7,259,895 B2 | |
| APPLICATION NO. | : 10/301440 | |
| DATED | : August 21, 2007 | |
| INVENTOR(S) | : Kirk Steven Tecu et al. | |

It is certified that error appears in the above-identified patent and that said Letters Patent is hereby corrected as shown below:

In column 3, line 52, delete "110" and insert -- 110A --, therefor.

In column 9, line 54, delete "field" and insert -- $field_i$ --, therefor.

In column 10, line 44, in Claim 2, delete "herein" and insert -- wherein --, therefor.

In column 10, line 67, in Claim 8, after "comprises" insert -- a --.

In column 12, line 20, in Claim 22, delete "Keyboard" and insert -- keyboard --, therefor.

In column 12, line 33, in Claim 25, delete "s" and insert -- a --, therefor.

In column 12, line 35, in Claim 25, delete "Second" and insert -- second --, therefor.

Signed and Sealed this

First Day of July, 2008

JON W. DUDAS
*Director of the United States Patent and Trademark Office*